Single Spiral Tube Layer

Ring Temperature Pick-Up

Assembled Polymerization Apparatus

Temperature Profile of Polymerization Colmun

United States Patent Office 3,451,986
Patented June 24, 1969

3,451,986
PROCESS AND APPARATUS FOR THE MASS POLYMERISATION OF ARYL VINYL COMPOUNDS
Bernard Metais, Paris, France, assignor to Societe Anonyme dite: Societe Nationale des Petroles d'Aquitaine, Courbevoie, France, a corporation of France
Filed May 18, 1965, Ser. No. 456,682
Claims priority, application France, June 4, 1964, 976,991
Int. Cl. C08f *1/04, 1/06*
U.S. Cl. 260—93.5                                  1 Claim

ABSTRACT OF THE DISCLOSURE

Improved axial and radial temperature control is obtained in continuous polymerization of vinyl compounds by introducing partially polymerized monomer into a reactor comprising a series of vertically overlapping rings each containing a series of layers of heat-exchange tubes arranged in an Archimedian spiral, with the centers of adjacent pairs of said layers being offset in opposite directions from the center of the column, and independently regulating the temperature of each ring in a predetermined manner.

---

This invention relates to an improved method for the continuous mass polymerisation of olefin compounds, and more particularly aryl vinyl compounds, such as styrene.

The invention also relates to a new apparatus for performing the said process.

Generally, the advantages of the mass polymerisation of styrene as compared with other methods of polymerisation, i.e., suspension, emulsion or solution polymerisation, are bound up with the absence of foreign substances in the polymerisation medium. This results in purer and more homogeneous polymers which are characterised by a good distribution of the molecular weights. Also, the energy yield and cost of operation are reduced, since the substance masses used are limited as compared with the mass of the final polymer.

However, the reaction governing the mass polymerisation of styrene is highly exothermic and must therefore be checked. To this end it has been proposed to operate continuously or discontinuously at high temperatures with very short passage times through the reactor for the material under polymerisation, but all these processes have a very low energy yield and numerous difficulties.

Among well-known styrene mass polymerisation processes we may cite those which generally comprise introducing partially polymerised (for example 30% prepolymerised) styrene at the top of a polymerisation column and allowing the product to flow to the bottom thereof. As the product descends its polymerisation is completed. Generally, the column is divided up into various zones or rings, each of which is set to the required predetermined temperature independently. For example, without any limitation, each temperature can be so adjusted that the rate of polymerisation remains constant over the entire height of the column.

Each temperature may also be so adjusted that the material remains sufficiently fluid to flow.

The use of heat-exchanger tubes inside the polymerisation column has not yet solved the problem arising out of the exothermic nature of the reaction, since their presence results in uncontrollable temperature gradients.

The attempt has been made to obviate these disadvantages by providing the columns with bladed agitators to ensure that the material is agitated as it flows between the heat-exchanger tubes. At the bottom of the column, however, the movement of the blades is obstructed by the increased viscosity of the material under reaction and downstream of the blades the inequalities in the movement of the particles undergoing free agitation result in the formation of new unfavourable temperature gradients.

It is also known that the length of the chains and hence the mechanical strength properties of the resultant polymer decreases with increasing polymerization temperature. It is also known that the speed of polymerisation increases with the temperature.

If the temperature is not uniform in a section of the polymerisation column, the molecular dispersion becomes very considerable. The resultant product does not have satisfactory mechanical properties. These temperature irregularities also promote the penetration of monomeric styrene through the column and the effect of this is overheating of the styrene and an increased proportion of low molecular weights in the final product. The above-mentioned unfavourable effect on molecular dispersion also applies to this case.

Within the framework of the present invention it has now been discovered that a more satisfactorily distributed elimination of the polymerisation heat results in polymers which have better mechanical qualities, and that a better distribution of the heat-exchange surfaces gives better uniformity of the temperature, which obviates the above disadvantages.

In the improved continuous mass polymerisation process of the present invention, an olefin compound, and more particularly an aryl vinyl compound, such as styrene, is subjected to polymerisation-producing conditions as it flows through a reaction column. The present invention relates more particularly firstly to control of the axial and radial temperature gradient within the column and secondly to control of the flow of the partially or totally polymerised substance through the reaction column or tower; finally, it relates to pick-up systems for measuring the temperature of the material.

The apparatus for carrying out the invention includes heat-exchange surfaces inside the polymerisation column which are arranged preferably in the form of an Archimedean spiral in a polymerisation column section.

The tube spirals are distributed in layers each situated in the same horizontal plane and each section comprises a plurality of layers of spirals and is heated or cooled independently by an appropriate circuit. A specific ratio is chosen between the pitch of the spirals and the distance between the layers of spirals so as to obtain maximum efficiency, and this ratio is calculated as indicated hereinbelow by way of example for polystyrene. By a specific distribution of the spirals along the vertical axis of the column the density of the spirals and their position in a particular section are so selected that the spirals appear to overlap vertically in the section in question when the latter is examined in plan view.

To facilitate construction, the spiral is given a constant pitch and the tubes preferably have an elliptical profile (for example 25 x 46 mm.) but they may be given any suitable profile.

To facilitate construction, the spiral can be reduced to the form of semicircles whose centres coincide on main centres spaced by an amount equal to the pitch of the spiral. The systems are of integral construction so that they can be readily withdrawn from the column for any repairs.

The particular arrangement of the layers of tubes in spirals according to the invention promotes transfer of the polymerisation heat and hence distributes the temperature more satisfactorily while obviating any hot spots. They also obviate any preferential creep of the material because of the adequate distribution of the tubes, which forms an obstacle to excessively fast flow. The resultant polymer has a better distribution of the mean molecular weights.

The arrangement of the heat-exchanger tubes according to the invention has been selected as a result of a theoretical survey carried out within the scope of this invention.

As indicated hereinbefore, the mass polymerisation reaction, for example of styrene, is a highly exothermic reaction. A study of heat exchanges in a slow-flowing fluid which is the site of an exothermic chemical reaction results in the following well-known Equation 1:

$$\lambda\left(\frac{\delta T^2}{\delta X^2}+\frac{1}{X}\frac{\delta T}{\delta X}+\frac{\delta^2 T}{\delta Z^2}\right)+\rho V c \frac{\delta T}{\delta Z}=Q \quad (1)$$

in which the symbols have the following meaning:

T = temperature in degrees centigrade at cylindrical abscissa point X and cylindrical ordinate point Z of column,
V = speed of flow,
$\rho$ = specific mass of fluid,
c = heat per unit of mass,
$\lambda$ = conductivity coefficient of the fluid,
Q = quantity of heat emitted per unit of volume and time.

In a given section, for a given temyperature vertical profile, the temperature gap between two surfaces parallel to the direction of flow is denoted by the Formula 2:

$$\Delta T_m = \frac{(Q-\rho c V m A)}{\lambda} \frac{e^2}{4} \quad (2)$$

wherein the symbols have the following meaning, apart from the other above-mentioned symbols:

A = mean $\delta T/\delta 6$ in the zone in question,
Vm = mean speed in said zone,
e = distance between the two surfaces.

The advantage of a spiral distribution is thus immediately apparent to obviate any hot spots within the material.

The pitch of the spiral can be calculated for each case. It will be assumed that it corresponds to the following expression 3:

$$2K\sqrt{\frac{\lambda \Delta Tm}{Q-\rho c V mA}} \quad (3)$$

where the symbols have the above meaning and $\Delta Tm$ denotes the maximum admissable temperature difference taking into account the required polymer properties.

With a column of a diameter between 0.75 m. and 2 m., K is a coefficient which depends on the shape of the coils. Its value is in the region of:

$$\frac{1}{\left(1-\frac{d}{e}\right)^2}$$

where
d = mean diameter of tube section
e = pitch of spiral.

Most frequently, $\lambda$ and $\Delta Tm$ cannot be determined exactly. The appropriate value of $\Delta Tm$ for the required production and the $\lambda$ value of the fluid during reaction must then be determined experimentally.

The temperature profile and hence the value of A are determined in dependence on the speeds of polymerisation and the characteristics of the polymer formed at the various temperatures.

An experimental survey has shown that the Formula 4 resulting from the above formulae and equations $$e\left(1-\frac{d}{e}\right)^2 = 2\sqrt{\frac{\lambda \Delta Tm}{Q-\rho c V mA}} \quad (4)$$

gives good results. It applies irrespective of the polymer, provided that the speed of flow is low (2 metres per hour–0.1 metre per hour).

There is a bottom limit to the pitch as a result of the rubbing of the fluid on the transfer surfaces.

The distance between two consecutive layers is so determined as to maintain a total fluid volume/heat exchange surface ratio compatible with the elimination of the heat. In the case of the mass polymerisation of styrene the distance generally adopted is 0.1 m.

This ratio obviously varies with the section under consideration if polymerisation does not take place at a constant speed throughout the column, the value 0.1 m. being a mean value.

The ratio between the pitch and the distance between the spirals depends upon their position in the column. At levels where the polymerisation rate is highest (thus in the middle of the column) the values of the pitch and spacing are at a minimum while at the bottom of the column the pitch and spacing may be increased.

The temperature in each column section is controlled by a pick-up which has the novel feature of physically producing a temperature mean within a section. The system consists of a circular bracing (for example of a section of 5 mm.) of a material which is a good conductor (for example stainless steel) to cover the entire section of the ring, a thermocouple inclined for constructional reasons being soldered to the centre of the bracing. Calculations have shown that the temperature measured in this way represents the temperature of the material (for example polystyrene) to within one-tenth of a degree C. The heat lost by conduction along the heat measuring casing is low in relation to the heat received from the polystyrene along the bracing. The bracing therefore tends to assume the polystyrene temperature (equalisation of the temperatures being obtained by heat exchange) and the thermocouple thus measures the temperature of the styrene by measuring the temperature of the bracing. On the other hand, in the case of the ordinary temperature measurement by an immersed pyrometer the error may be high (10° C.). The temperature measuring station is at the top of each ring and serves to control the temperature of the oil flowing in the coils of the ring immediately above. This arrangement is adopted to facilitate construction and repairs.

The invention is illustrated by way of example in the accompanying drawings, in which.

Figure 1:
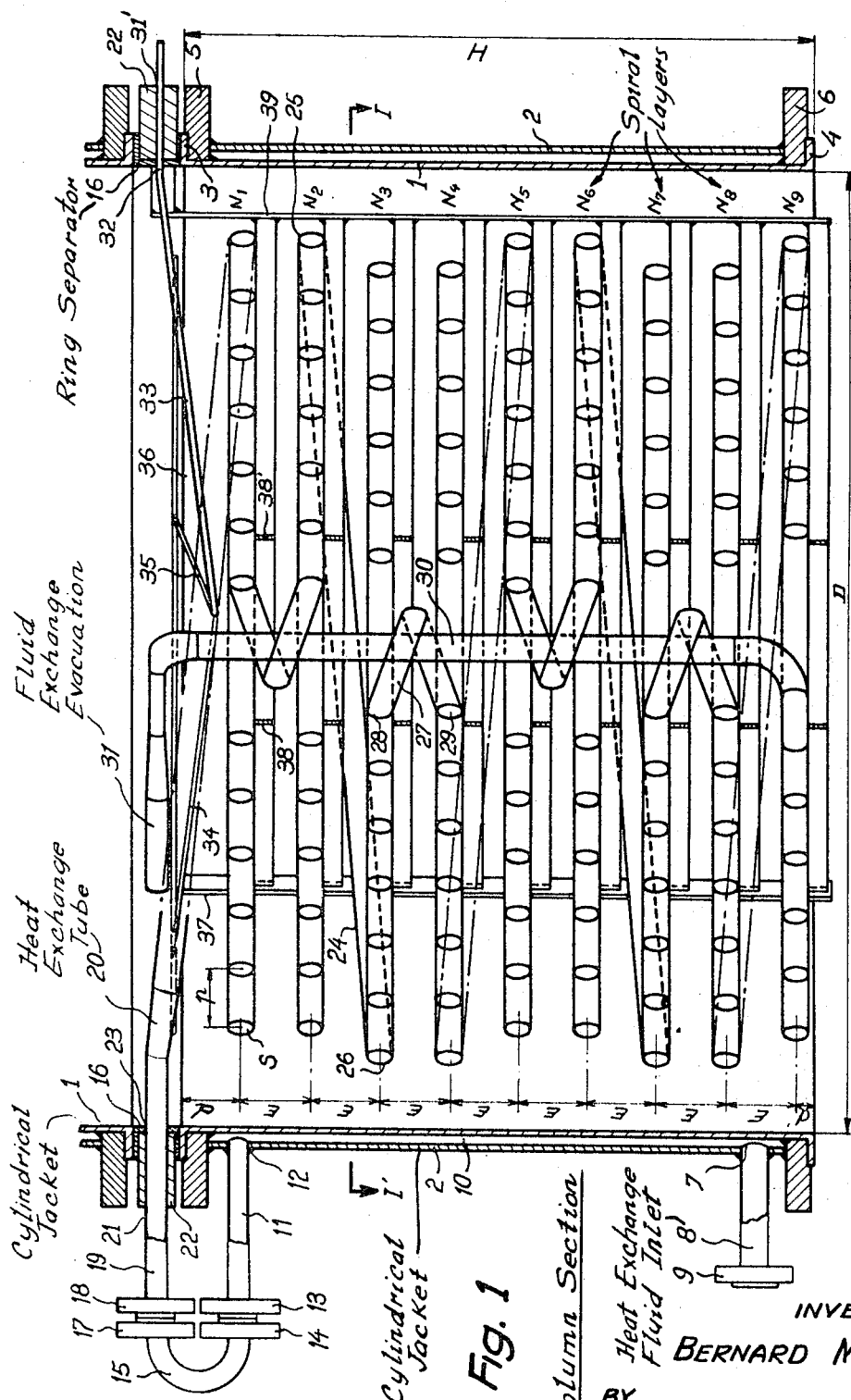
FIGURE 1 is an axial vertical section of a standard polymerisation column section or ring, provided with an internal heat exchanger formed by a layer of tubes arranged as a spiral in accordance with the present invention, on the line I–I' of FIGURE 2.

The ring shown in FIG. 1 is bounded by a first cylindrical jacket or wall 1 separated from a second cylindrical outer jacket 2, the two jackets being concentric, the edges 3 of the top end of the wall 1 and the edges 4 of the bottom end of the wall being bent outwards. Annular supports 5 and 6 are respectively secured to the outer corners formed by the wall 1 and its bent edges 2 and 3. The top and bottom edges of the jacket 2 are secured for example welded, respectively to the annular supports 5 and 6. An aperture 7 is formed in the jacket 2 near its bottom end. The heat-exchange fluid inlet 8 is inserted into and welded in said aperture 7 and may be connected by a flange 9 to a pipeline supplying the said fluid. The fluid flows in the space 10 separating the wall 1 and the jacket 2 and flows in a tubular connection 11 inserted and welded in an aperture 12 formed in the jacket 2 near its top end. The tubular connection 11 is secured by flanges 13 and 14 to a bent connection tube 15 extending towards the top end of the ring, its top end being in the plane of a U-section ring 16 intended more particularly for separating two consecutive rings, to which it is secured respectively against the top bent edges 3 of one ring and the bottom bent edges 4' of a following ring. The top end of the bent connection 15 is connected by flanges 17 and 18 to the tubular inlet end 19 of the heat exchange tube 20 in the ring. The inlet end 19 penetrates into an aperture 21 formed in a support 22 housed in the U-section of the profiled ring 16 and successively in an aperture 23 of the same diameter and in the same plane formed in the wall 1.

The heat exchange tube 20 has a constant S-section which progresses continuously inside the ring which comprises nine layers, $N_1$ to $N_9$, all spirals in the same layer being in the same plane. The movements of the spirals in each successive layer alternate respectively from the outside to the inside of a given spiral and from the inside to the outside of the next spiral, counting such alternation from the top layer $N_1$. The alternating effect of the movements of the spirals is obtained by forming the parts of the tube connecting two consecutive layers alternately as a first type of long helix 24 with a downward movement, whose ends correspond to two opposite tube ends 25 and 26 each situated on the larger-diameter tube part of two consecutive layers, and as a second type of short helix 27 again with a downward movement, the ends corresponding to two tube points 28 and 29 each situated on the smaller-diameter tube part of two consecutive layers. It will be apparent from the drawing that the tube entry 19 to the ring continues as a long helix of the said type. From the smallest diameter spiral of the end layer $N_9$ the tube rises vertically at 30 along the axis of the ring and comprises a bent part terminating at the top of the ring 31 where the exchange fluid is evacuated. The centers of adjacent pairs of the layers are offset in respective opposite directions on each side of the axial tube 30.

The temperature detector system 33 of the pick-up penetrates into an aperture 31' formed in the support 22 housed in the U-section of the profiled ring 16 and successively in an aperture 32 of the same diameter and in the same plane formed in the wall 1. The pick-up comprises the bracing, two arms of which are shown at 34 and 35. The partial elements of the frame on which the arms of the bracing rest are denoted by references 36, 37, 38, 38' and 39 in FIG. 1. The pick-up is shown with supplementary details in the plan view of FIG. 3 described hereinafter.

The elliptical section of the tube is 25/46 mm.
The diameter D between the cylindrical walls 1 of the ring is 1.5 m.
The height H of the ring is 1 m.
The pitch P of the spiral in a layer is equal to 9 cm. and the spacing E between the planes of the layers is equal to 11 cm. Between the top edge of the ring and the horizontal axis of the top layer $N_1$, the distance $d$ is equal to 9.5 cm. Between the horizontal axis of the end layer $N_9$ and the edge of the base of the ring there is a distance $d'$ equal to 2.5 cm.

Figure 2:
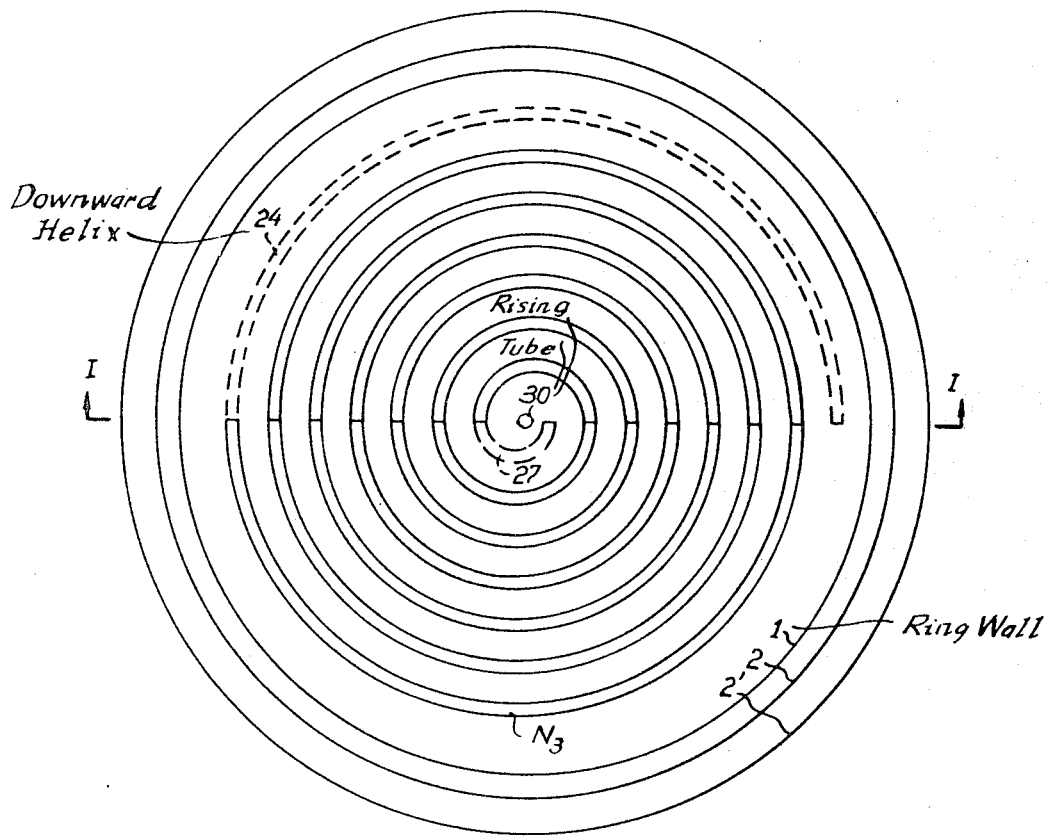
FIGURE 2 is a plan view to a reduced scale along the axis I–I' in FIGURE 1, of the third and seventh spiral tube layer.

An example of one of the spiral tube layers housed in a polymerisation column ring is shown in FIG. 2, wherein reference 1 denotes the ring wall, reference 2 denotes the jacketing and 2' denotes an additional outer jacketing. More particularly, the figure is a plan view of the layer of tubes $N_3$ exactly overlapping the layer $N_7$ of FIG. 1, the two layers being superimposed in the same plan view. The solid-line tube portion indicates the layer in the same plane, while the outer dotted-line tube portion corresponds to the long helix 24 in FIG. 1 while the inner dotted-line tube portion corresponds to the short helix 27 of FIG. 1. The section of the vertical part of the tube is shown at 30.

Figure 3:
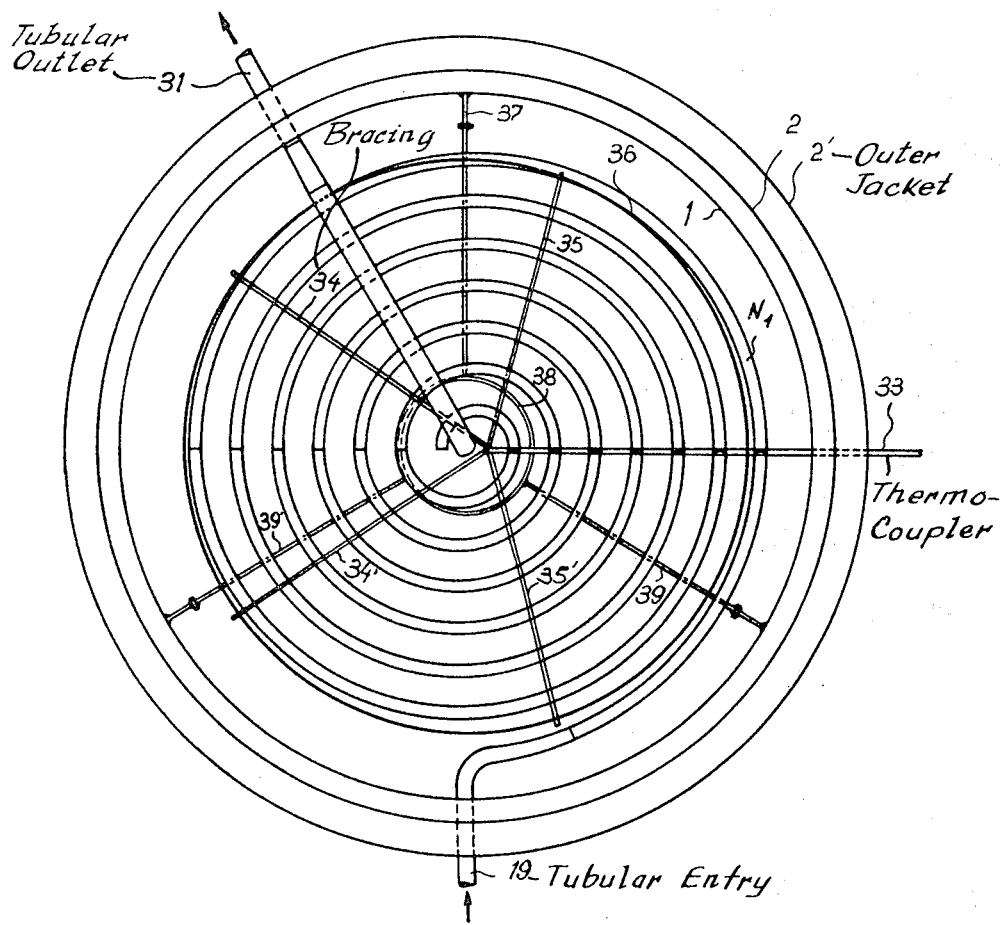
FIGURE 3 is a diagram combining a plan view of a temperature pick-up system in a column ring and a plan view of the first spiral tube layer.

The temperature pick-up system for control of the temperature in each ring is shown in FIG. 3, wherein the bracing is formed by arms 34, 35, 34' and 35' resting on the frame elements 36, 37, 38, 39 and 39'. The inclined thermocouple soldered to the centre of the bracing is shown at 33.

The same figure shows a plan view of the spiral layer $N_1$, which is also shown in FIG. 1, with its tubular entry part 19, and the tubular outlet part 31 of the exchanger tube. The wall 1, jacket 2 and additional outer jacket 2' are also shown in FIG. 3.

The process according to the present invention can be performed in the apparatus hereinbefore described with appropriate modifications depending upon the types of specific mass polymerisation required. In each case it will be advantageous to calculate the optimum dimensions of the parts of the apparatus on the principles hereinbefore enumerated, the calculations being based on the above example for the polymerisation of styrene. The apparatus with the essential features of the present invention may be used more particularly for carrying out mass polymerisation and copolymerisation of various aromatic monovinyl compounds such as styrene, ortho-methyl-styrene, meta-methyl-styrene, para-methyl-styrene, ortho- and para-chloro-styrene, para-ethyl-styrene, ortho- and para-dimethyl-styrene and their mixtures. It is also possible to use mixtures of aromatic monovinyl compounds with various unsaturated organic compounds copolymerizable with the above compounds of the styrene series, such as vinyl chloride, alpha-methyl-styrene, ethyl acrylate, methyl acrylate or acrylonitrile.

By adapting the polymerisation apparatus to the polymerisation of specific monomers, various monomers can be mass polymerised in the apparatus according to the invention. Styrene may be continuously polymerised in an installation of which an example is given below by way of illustration with reference to FIG. 4 of the accompanying drawings, which shows apparatus according to the invention.

Figure 4:
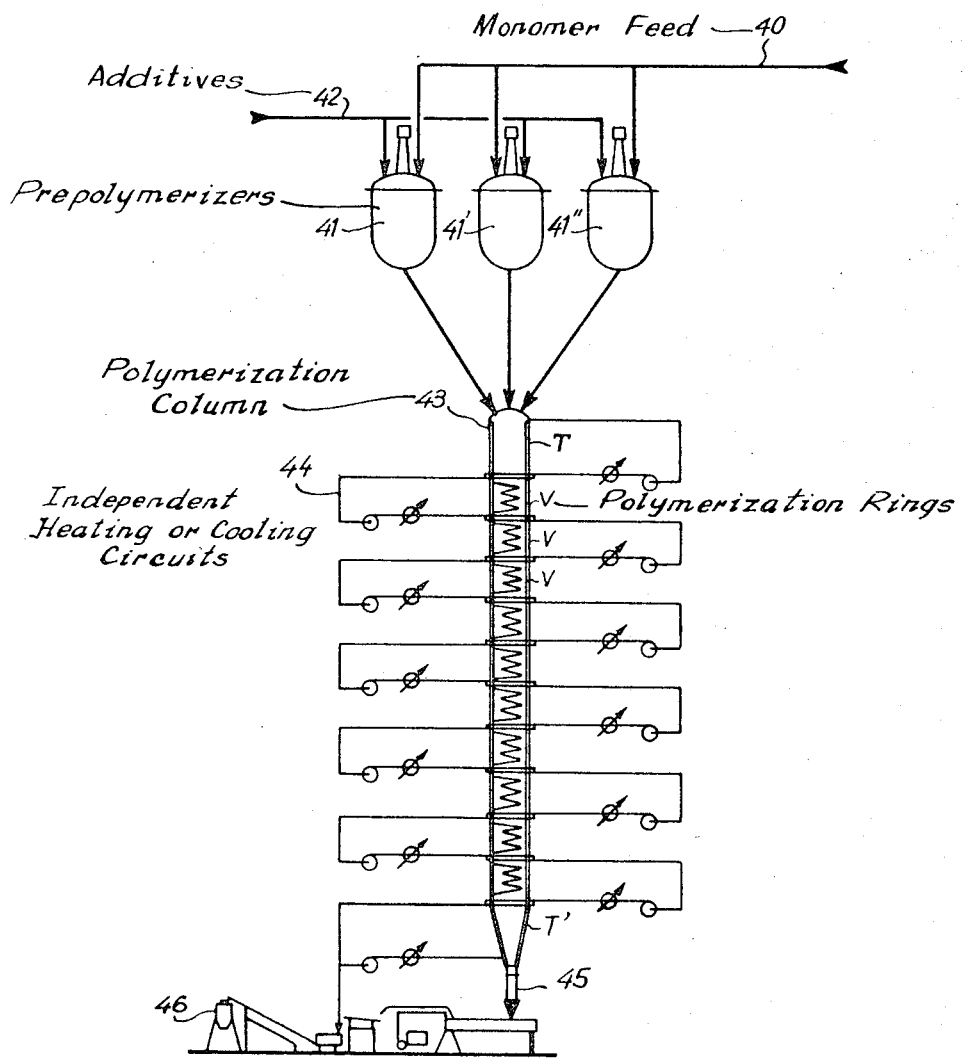
FIGURE 4 shows a polymerisation apparatus according to the invention.

In the apparatus shown in FIG. 4, the styrene is supplied to 40 via a three-way pipeline to three prepolymerisers 41, 41' and 41", to which the polymerisation additives are also fed by an appropriate pipe 42. The prepolymerised styrene flows to the head of the polymerisation column 43, which is divided up into a series of rings V as described hereinbefore and shown in FIG. 1. The column also comprises a head ring T and a frusto-conical portion T' at its base.

Each ring is heated or cooled by an independent heating or cooling circuit 44.

The polystyrene obtained flows away at the bottom of the column 45 which may be provided with an extruder, and is fed by conventional means to storage or treatment systems 46.

An example of the polymerisation of styrene in an installation comprising apparatus according to the present invention as described more particularly hereinbefore with reference to FIG. 4 will now be given. This example is given solely by way of illustration.

Example

A column for mass polymerisation of styrene to produce 4,500 metric tons of polystyrene per annum is used as in the diagram shown in FIG. 4 and described hereinbefore.

The styrene prepolymerised to 30% in the prepolymerisers operating at 92 to 93° C. flows through this column. To determine the required retention time and the appropriate temperature profile, the influence of the temperature on the speed of reaction and the quality of the resultant products was studied.

Table I below shows the variations in the initial speed of the styrene polymerisation against the temperature and the variations in the molecular weight of the resultant styrene.

TABLE I

| Polymerisation temperature in ° C. | Initial speed of polymerisation in percent/h. | Molecular weight of the resultant polystyrene |
|---|---|---|
| 90 | 1.02 | 610,000 |
| 100 | 2.15 | 420,000 |
| 110 | 4.25 | 310,000 |
| 120 | 8.5 | 230,000 |
| 130 | 16.2 | 175,000 |
| 140 | 28.4 | 130,000 |
| 150 | 40 | 100,000 |
| 160 | 80 | 83,000 |
| 170 | 120 | |

The speed of polymerisation decreases greatly with the conversion rate so that considerable temperatures are required at the end of the reaction to obtain a high conversion rate (>99%) within a limited period (24 hours).

Figure 5:
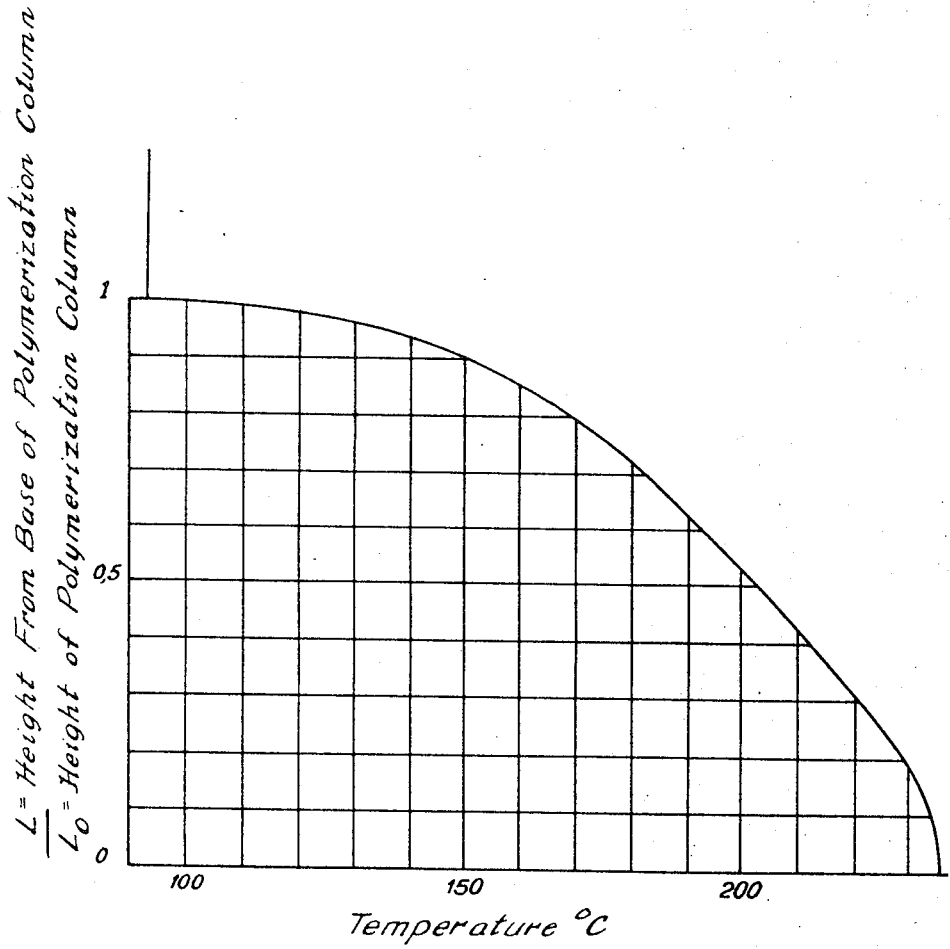
FIGURE 5 shows the temperature profile along the polymerisation column.

These considerations led to the adoption of the temperature profile along the polymerisation column as shown in FIG. 5 of the accompanying drawings, and a retention time of 24 hours.

In FIG. 5 the $x$-axis denotes the temperatures in ° C. and the $y$-axis denotes the ratio $L/Lo$ between the height $L$ of the position of the ring in question considered as from the base of the column and the total height of $Lo$ of the polymerisation column.

The overall dimensions of the column are deduced therefrom, viz:

Height=14 m.
Diameter=1.5 m.

It is divided up into 11 rings of a height of 1 m. plus a head ring and a frusto-cone at the base.

The internal exchange surfaces selected are stainless steel tubes of an elliptical section 25/46 to give the maximum exchange surface for a minimum volume.

The rate of polymerisation is at the maximum in the rings 2, 3 and 4 (15% per hour approximately). This is associated with a heat evolution of $7.5.10^{-3}$ cal./g./s. and the term $\rho CVmA$ is about $1.5.10^{-3}$ cal./g./s. To check the reaction correctly and to obtain the maximum homogeneity of polymerisation the value selected for $\Delta Tm$ is 20° C.

The value of the coefficient of conductivity (styrene-polystyrene mixture) may be $1.2.10^{-3}$ cal./cm./° C.

By applying Equation 4 above to determine the pitch, the value for the spiral pitch is found to be 9 cm.

The spacing is 11 cm.

A higher pitch and spacing may be used for the rings lower down (15 cm./15 cm. for example), since the exothermal nature is less appreciable.

By way of non-limitative example, a polystyrene thus obtained according to the present invention has the properties shown in Table II below. These properties compare favourably with the corresponding properties of a conventional polystyrene.

TABLE II

| Properties | Conventional polystyrene | Polystyrene according to the invention |
|---|---|---|
| Tensile strength, kg./cm.$^2$ | 450–500 | 500 |
| Elongation, percent | 1.5–2.7 | 1.5 |
| Modulus of elasticity under tranction, kg./cm.$^2$ | 12,000–30,000 | 30,000 |
| Rockwell hardness A, scale M | 65–90 | 85 |
| Temperature of deformation under heat (at a pressure of 18.5 kg./cm.$^2$ for a sample of 12.7 x 6.35 mm.) in ° C. | 80 | 80 |
| Vicat temperature in ° C. | 87–100 | 90 |
| Viscosity in 10% toluene at 25° C, measured in centipoises | 28–35 | 25 |
| Volatile content, percent | 0.8–0.12 | 0.5 |

I claim:
1. A process for polymerizing vinyl compounds, comprising introducing vinyl monomer in a continuous manner in a partially polymerized state at the top of a polymerization column under polymerization conditions at a speed of flow ranging between 2 meters per hour and 0.1 meter per hour; controlling the axial and radial temperature gradient in said column and the flow path of the polymerization material by directing asid material over a series of rings distributed along the vertical axis of said column so as to overlap vertically and comprising heat-exchange surfaces formed by tubes arranged in an Archimedean spiral into a layer, and by a series of said layers arranged to form said rings, the centers of adjacent pairs of said layers in said ring being offset in respective opposite directions from the center of said column; controlling in an independent and predetermined manner the temperature in each of said rings to maintain the polymerization rate at substantially the same level at each layer and maintain said materials sufficiently fluid to flow over the height of said column; and discharging the polymer at the bottom of said column.

References Cited

UNITED STATES PATENTS

| 389,900 | 1888 | Pratt | 23—285 |
| 470,822 | 1892 | Heide | 165—61 |
| 2,714,101 | 7/1955 | Amos | 260—93.5 |
| 2,727,884 | 12/1955 | McDonald | 260—93.5 |

JOSEPH L. SCHOFER, *Primary Examiner.*

J. C. HAIGHT, *Assistant Examiner.*

U.S. Cl. X.R.

260—85.5, 86.3, 86.7, 87.5, 88.1, 88.2